United States Patent
Gaonkar (10) Patent No.: US 10,911,372 B2
(45) Date of Patent: Feb. 2, 2021

(54) DISTRIBUTED QUALITY OF SERVICE CONTROL FOR INTER-CLUSTER DATA TRANSMISSION

(71) Applicant: Cisco Technology, Inc., San Jose, CA (US)

(72) Inventor: Shravan Gaonkar, Gainesville, FL (US)

(73) Assignee: Cisco Technology, Inc., San Jose, CA (US)

(*) Notice: Subject to any disclaimer, the term of this patent is extended or adjusted under 35 U.S.C. 154(b) by 67 days.

(21) Appl. No.: 15/939,796

(22) Filed: Mar. 29, 2018

(65) Prior Publication Data

US 2019/0306080 A1 Oct. 3, 2019

(51) Int. Cl.
*H04L 12/927* (2013.01)
*H04L 12/813* (2013.01)
*H04L 12/24* (2006.01)
*H04L 29/08* (2006.01)

(52) U.S. Cl.
CPC ........ *H04L 47/805* (2013.01); *H04L 41/0816* (2013.01); *H04L 41/0893* (2013.01); *H04L 41/30* (2013.01); *H04L 47/20* (2013.01); *H04L 67/101* (2013.01); *H04L 67/1097* (2013.01)

(58) Field of Classification Search
CPC ............... H04L 47/805; H04L 41/0816; H04L 41/0893; H04L 41/30; H04L 47/20; H04L 67/101; H04L 67/1097
See application file for complete search history.

(56) References Cited

U.S. PATENT DOCUMENTS

| 9,378,067 B1 | 6/2016 | Agarwala et al. |
| 9,521,198 B1 | 12/2016 | Agarwala et al. |
| 2001/0034752 A1* | 10/2001 | Kremien ................. G06F 9/505 718/105 |

(Continued)

OTHER PUBLICATIONS

Egilmez, et al., "Distributed QoS Architectures for Multimedia Streaming Over Software Defined Networks," IEEE Transactions on Multimedia, vol. 16, No. 6, Oct. 2014, 13 pages. (Year: 2014).*

(Continued)

*Primary Examiner* — Nicholas R Taylor
*Assistant Examiner* — Sanjoy Roy
(74) *Attorney, Agent, or Firm* — Edell, Shapiro & Finnan, LLC (57) ABSTRACT

Techniques for implementing distributed quality of service controls for data transmissions between clusters in a clustered distributed storage system are described. In one embodiment, a method of distributed quality of service control includes establishing a control channel between a first plurality of nodes associated with a first cluster. The method also includes setting a quality of service (QoS) policy for the first plurality of nodes that establishes a QoS parameter for data transmitted over a shared network from the first cluster to a second cluster. The method further includes communicating messages between the first plurality of nodes over the control channel to signal an allocated portion of the QoS parameter for each node. The method also includes transmitting data by the first plurality of nodes of the first cluster to a second plurality of nodes of the second cluster over the shared network according to the allocated portion.

23 Claims, 6 Drawing Sheets

(56) References Cited

U.S. PATENT DOCUMENTS

| | | | | |
|---|---|---|---|---|
| 2005/0169179 A1* | 8/2005 | Antal | ............... | H04L 41/0806 370/231 |
| 2008/0008095 A1* | 1/2008 | Gilfix | ............... | H04L 47/10 370/235 |
| 2008/0069059 A1* | 3/2008 | Yagyu | ............... | H04W 72/08 370/336 |
| 2014/0059265 A1* | 2/2014 | Iyer | ............... | G06F 9/5011 710/313 |
| 2014/0328178 A1* | 11/2014 | Haberland | ............... | H04W 28/08 370/235 |
| 2016/0062795 A1* | 3/2016 | Hu | ............... | H04L 47/783 718/104 |
| 2017/0142709 A1* | 5/2017 | Lake | ............... | H04L 67/142 |

OTHER PUBLICATIONS

Egilmez, et al., "Distributed QoS Architectures for Multimedia Streaming Over Software Defined Networks," IEEE Transactions on Multimedia, vol. 16, No. 6, Oct. 2014, 13 pages.

Kamali, et al., "Dynamic Data Allocation with Replication in Distributed Systems," 2011 IEEE 30th International Performance Computing and Communications Conference (IPCCC), Nov. 2011, 8 pages.

\* cited by examiner

DISTRIBUTED QUALITY OF SERVICE CONTROL FOR INTER-CLUSTER DATA TRANSMISSION

TECHNICAL FIELD

This disclosure relates generally to quality of service for a computer network.

BACKGROUND

In recent years, cloud-based data storage has emerged to offer a solution for storing, accessing, and managing electronic data owned or controlled by various types of private and public entities. Distributed storage systems may offer a storage platform designed to provide object based, block based, and file based storage from a single distributed storage cluster in a cloud. A distributed storage cluster may contain numerous nodes for storing objects and other data. Generally, a distributed storage system is designed to evenly distribute data across the cluster. Multiple replicas of data can be maintained according to a replication factor in order to provide fault tolerance and high availability to users, applications, and other systems. When node failure occurs in a cluster, replicas may be copied to new nodes to maintain the replication factor in the cluster.

A clustered distributed storage system is one in which data is replicated from one cluster of nodes to another cluster of nodes. All of the nodes in one cluster can participate and replicate data to all of the nodes in the other cluster, if necessary. The inter-cluster network between the two clusters may be a shared resource. For example, a dedicated line between two data-centers can be set up as a disaster recovery pair of clusters. In such situations, Quality of Service (QoS) parameters may be enabled for the data transmitted between the nodes in the two clusters of the clustered distributed storage system.

DESCRIPTION OF EXAMPLE EMBODIMENTS

Overview

Presented herein are techniques for implementing distributed quality of service controls for data transmissions between clusters in a clustered distributed storage system. In an example embodiment, a method includes establishing a control channel between a first plurality of nodes associated with a first cluster. The method also includes setting a quality of service (QoS) policy for the first plurality of nodes that establishes at least one QoS parameter for data transmitted over a shared network from the first cluster to a second cluster made up of a second plurality of nodes. The method further includes communicating messages between the first plurality of nodes over the control channel to signal an allocated portion of the at least one QoS parameter of the QoS policy between each node of the first plurality of nodes. The method also includes transmitting data by the first plurality of nodes of the first cluster to the second plurality of nodes of the second cluster over the shared network according to the allocated portion of the at least one QoS parameter communicated over the control channel.

Example Embodiments

Figure 1:
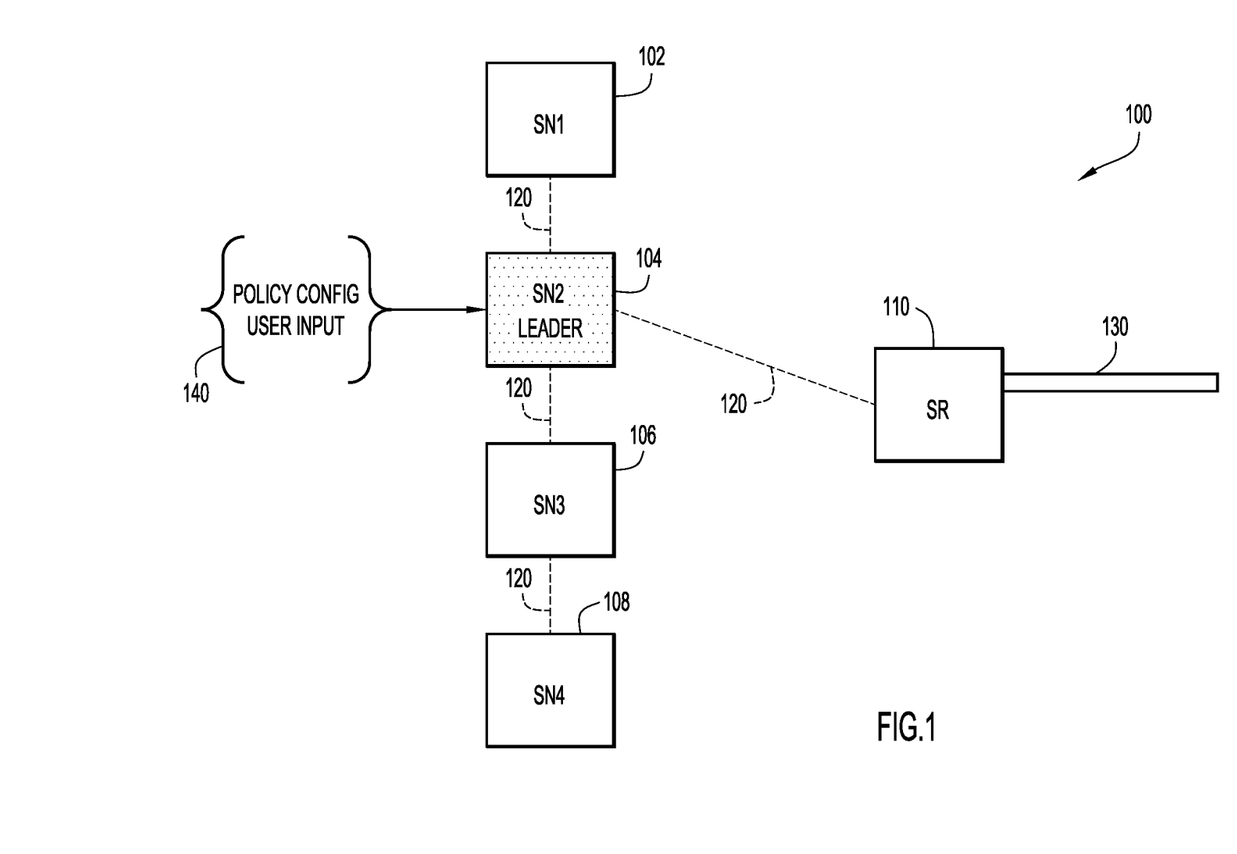
FIG. 1 is a block diagram illustrating a cluster of source nodes in which distributed quality of service controls may be implemented, according to an example embodiment.

FIG. 1 is a block diagram illustrating a first cluster 100 of nodes in which distributed quality of service controls may be implemented according to an example embodiment. First cluster 100 may be a computer network, or a part of a network, and includes a plurality of nodes, including a first node 102, a second node 104, a third node 106, and a fourth node 108. It should be understood that four nodes are illustrated in this embodiment, however, a cluster, for example, first cluster 100, may include any number of nodes. For example, in one embodiment, first cluster 100 may be a data center and plurality of nodes 102, 104, 106, 108 may be configured to store data.

Figure 3:
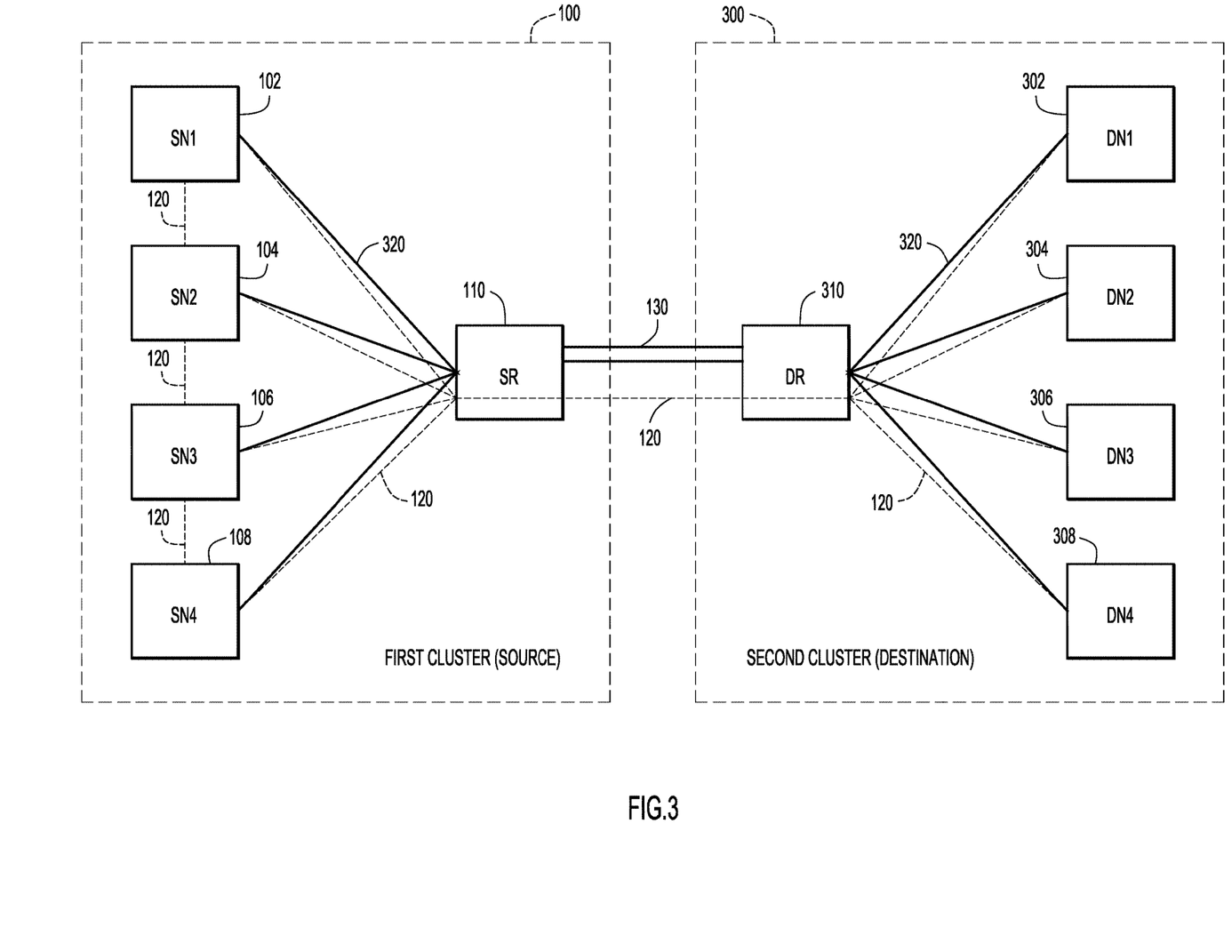
FIG. 3 is a diagram illustrating an inter-cluster data transmission with distributed quality of service controls, according to an example embodiment.

In this embodiment, first cluster 100 also includes at least one router 110 that is in communication plurality of nodes 102, 104, 106, 108 and is configured to provide external connectivity to first cluster 100 and plurality of nodes 102, 104, 106, 108. For example, router 110 may provide external connectivity for data transmissions to and from first cluster 100 via a shared network 130. In this embodiment, shared network 130 is a dedicated communication network between first cluster 100 and a second cluster (as shown in FIG. 3). In other embodiments, router 110 may provide additional or different connectivity to other external networks to allow first cluster 100 and plurality of nodes 102, 104, 106, 108 to communicate with other clusters and/or other devices. As shown in FIG. 1 and FIG. 3, each cluster (e.g., first cluster 100 and second cluster 300) is shown having at least one router (e.g., router 110 and router 310). It should be understood, however, that in other embodiments, a cluster may have multiple routers.

In various embodiments, plurality of nodes 102, 104, 106, 108 of first cluster 100 may be network elements of any of a variety of types, such as data storage devices, servers, switches, routers, gateways, as well as networking appliances, such as firewalls, intrusion detection systems, etc. The network elements may be physical, virtual (e.g., implemented in software), or a combination of both. As described above, in an example embodiment, first cluster 100 may be a data center and plurality of nodes 102, 104, 106, 108 may be network elements configured to store data.

According to the principles of the embodiments described herein, distributed quality of service controls are provided for inter-cluster data transmissions. For example, first cluster 100 may be referred to as a source cluster from which data is transmitted to a second cluster (as shown in FIG. 3) that may be referred to as a destination cluster for the transmitted data. In addition, a first plurality of nodes (e.g., nodes 102, 104, 106, 108) associated with the first cluster 100 (i.e., the source cluster) may be referred to as source nodes and a second plurality of nodes (as shown in FIG. 3) associated with the second cluster (i.e., the destination cluster) may be referred to as destination nodes. Similarly, router 110 may be referred to as a source or egress router that provides external connectivity from first cluster 100 (i.e., the source cluster) over shared network 130 to a second router (shown in FIG. 3) associated with the second cluster (i.e., the destination cluster) that may be referred to as a destination or ingress router.

In an example embodiment, upon bring-up of the source cluster (e.g., first cluster 100), plurality of nodes 102, 104, 106, 108 elect a leader node that will communicate with external entities. External entities may include administrators implementing policies and/or inputs 140 to first cluster 100, for example setting QoS policies and/or bandwidth usage limits for the cluster. External entities may also include nodes associated with one or more remote clusters, for example, a leader node associated with a destination cluster may communicate information associated with the remote cluster, such as health or status information. In this embodiment, second node 104 has been elected the leader node for plurality of nodes 102, 104, 106, 108.

Once a leader node has been elected for plurality of nodes 102, 104, 106, 108, the leader node may establish a two-way message passing channel between itself and all of the actively participating nodes in the cluster. In this embodiment, the leader node (e.g., second node 104) establishes a control channel 120 between the leader node 104 and each of the other nodes 102, 106, 108 of the plurality of nodes. Accordingly, control channel 120 is established between all of the nodes of the plurality of nodes 102, 104, 106, 108. In addition, the leader node (e.g., second node 104) may further establish control channel 120 with router 110. With this arrangement, control channel 120 is configured as a separate control channel path for sending and/or receiving messages to provide distributed Quality of Service (QoS) controls for the cluster.

According to the example embodiments, distributed QoS controls may be implemented to establish a QoS policy regarding requirements for one or more QoS parameters for data transmitted from one cluster to another (e.g., from first cluster 100 to second cluster 300). For example, QoS parameters may include bandwidth limits, latency (e.g., end-to-end delay), jitter, packet loss-rate, and/or availability. The distributed QoS controls may implement the QoS policy by communicating messages to the other nodes in the cluster, for example, over control channel 120, to signal an allocated portion of the at least one QoS parameter between the nodes. Additionally, the QoS policy may be static or dynamic. For example, feedback may be received over control channel 120 from other nodes in the source cluster (e.g., first cluster 100) and/or from nodes in the destination cluster (e.g., second cluster 300) regarding QoS performance or other information that allows for dynamically changing the allocated portions of the at least one QoS parameter between the nodes to best adhere to the QoS policy for the cluster.

In one embodiment, control channel 120 may use a protocol that is a non-standard command set that is executed as a remote procedure call. Further details regarding command sets used to communicate messages between the plurality of nodes to implement distributed QoS controls for data transmissions will be described below in reference to FIG. 4.

Figure 2:
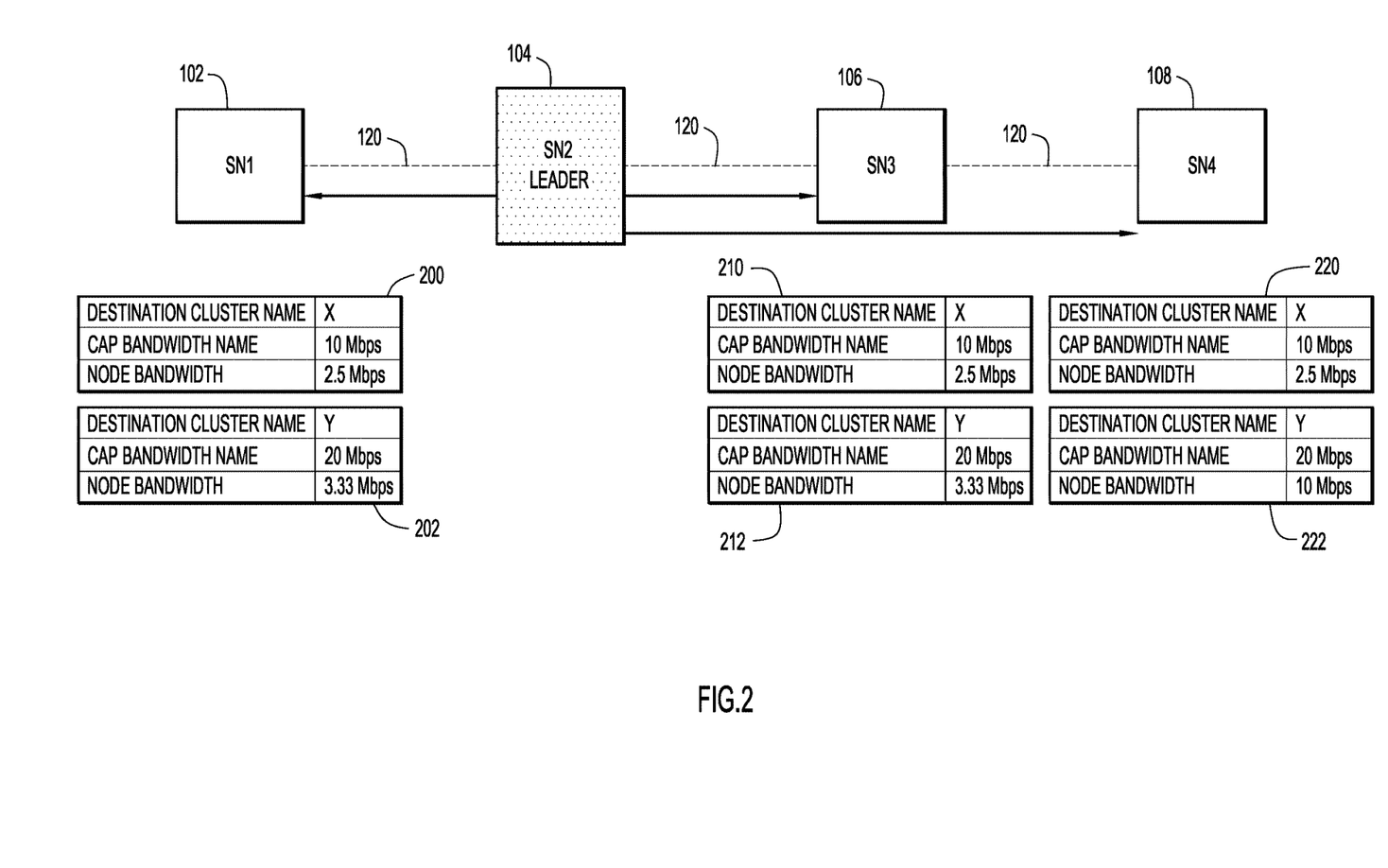
FIG. 2 is a diagram illustrating a leader source node communicating messages to other source nodes for distributed quality of service controls, according to an example embodiment.

Referring now to FIG. 2, a leader source node (e.g., second node 104) is illustrated communicating messages to other source nodes for distributed quality of service controls, according to an example embodiment. In an example embodiment, an external entity, such as an administrator, may set a new QoS policy associated with bandwidth limits for plurality of nodes 102, 104, 106, 108 of first cluster 100 via input 140 to leader node (e.g., second node 104). A QoS policy may include static and/or dynamic policies.

In this embodiment, the QoS policy may state, for example, that plurality of nodes 102, 104, 106, 108 are to equally share a first bandwidth limit of 10 Mbps for data transmissions from the source cluster (e.g., first cluster 100) to a first destination cluster (cluster X). The QoS policy may also state, for example, that plurality of nodes 102, 104, 106, 108 are to share a second bandwidth limit of 20 Mbps for data transmissions from the source cluster (e.g., first cluster 100) to a second destination cluster (cluster Y), with 50% of the bandwidth limit being allocated to fourth node 108 and the remaining bandwidth being allocated equally between the other nodes (e.g., first node 102, second node 104, and third node 106).

According to the principles of the example embodiments described herein, leader node (e.g., second node 104) communicates a plurality of messages over control channel 120 to the other nodes in first cluster 100 to implement the first and second bandwidth limits of the QoS policy. For example, leader node (e.g., second node 104) communicates a first message 200 to first node 102 over control channel 120 that signals details of the allocated bandwidth (e.g., 2.5 Mbps) to first node 102 within the first bandwidth limit of 10 Mbps according to the QoS policy for data transmissions to the first destination cluster (cluster X). Leader node (e.g., second node 104) also communicates a second message 202 to first node 102 that signals details of the allocated bandwidth (e.g., 3.33 Mbps) to first node 102 within the second bandwidth limit of 20 Mbps according to the QoS policy for data transmissions to the second destination cluster (cluster Y).

Leader node (e.g., second node 104) communicates a similar set of messages to third node 106 over control channel 120. In this example, the messages to third node 106 include a third message 210 that signals details of the allocated bandwidth (e.g., 2.5 Mbps) to third node 106 within the first bandwidth limit of 10 Mbps according to the QoS policy for data transmissions to the first destination cluster (cluster X) and a fourth message 212 that signals details of the allocated bandwidth (e.g., 3.33 Mbps) to third node 106 within the second bandwidth limit of 20 Mbps according to the QoS policy for data transmissions to the second destination cluster (cluster Y).

As shown in FIG. 2, leader node (e.g., second node 104) also communicates a fifth message 220 to fourth node 108 over control channel 120 that signals details of the allocated bandwidth (e.g., 2.5 Mbps) to fourth node 108 within the first bandwidth limit of 10 Mbps according to the QoS policy for data transmissions to the first destination cluster (cluster X). In this case, the QoS policy established that the plurality of nodes 102, 104, 106, 108 were to equally share the first bandwidth limit of 10 Mbps for data transmissions from the source cluster (e.g., first cluster 100) to the first destination cluster (cluster X). As a result, each of first message 200 to first node 102, third message 210 to third node 106, and fifth message 220 to fourth node 108 include the same amount of allocated bandwidth (e.g., 2.5 Mbps) for data transmissions to the first destination cluster (cluster X).

In this embodiment, however, the QoS policy for data transmissions to the second destination cluster (cluster Y) established that 50% of the second bandwidth limit should be allocated to fourth node 108 and the remaining bandwidth should be allocated equally between the other nodes (e.g., first node 102, second node 104, and third node 106). As a result, leader node (e.g., second node 104) communicates a sixth message 222 to fourth node 108 over control channel 120 that signals details of the allocated bandwidth (e.g., 10 Mbps) to fourth node 108 within the second bandwidth limit of 20 Mbps according to the QoS policy for data transmissions to the second destination cluster (cluster Y). In contrast, second message 202 to first node 102 and fourth message 212 to third node 106 include a different amount of allocated bandwidth (e.g., 3.33 Mbps) for data transmissions to the second destination cluster (cluster Y) than the allocated bandwidth to fourth node 108 (e.g., 10 Mbps). With this arrangement, distributed quality of service controls are provided for inter-cluster data transmissions.

In this example, the QoS policy established requirements for a bandwidth limit. However, as described above, distributed QoS policies according to the principles of the embodiments described herein may establish requirements for one or more QoS parameters for data transmitted from one cluster to another, including, for example bandwidth limits, latency (e.g., end-to-end delay), jitter, packet loss-rate, and/or availability. The distributed QoS controls may implement the QoS policy by communicating messages to the other nodes in the cluster, for example, over control channel 120, to signal an allocated portion of the at least one QoS parameter between the nodes. For example, in another embodiment, if a source node became unavailable at the source cluster (e.g., first cluster 100), bandwidth could be redistributed among the remaining nodes. In another example embodiment, if a source side READ latency on a source node has increased, bandwidth may be redistributed to other nodes in the source cluster and the rate of data transmission at the affected node may be reduced to improve the overall QoS of the cluster.

In conventional systems, QoS policies are typically enforced at the edge-router level. In contrast, according to the example embodiments described herein, the QoS policy enforcement mechanism is distributed to individual nodes to collaborate and effectively provide a distributed QoS policy over a shared network. The principles of the embodiments described herein may be further explained in reference to FIG. 3. FIG. 3 is a diagram illustrating an inter-cluster data transmission with distributed quality of service controls, according to an example embodiment.

In this embodiment, a source cluster (e.g., first cluster 100) includes a first plurality of source nodes (e.g., first node 102, second node 104, third node 106, and fourth node 108) that are connected with a source egress router (e.g., router 110). Source cluster (e.g., first cluster 100) is connected with at least one destination cluster, for example, a second cluster 300, over shared network 130. The destination cluster (e.g., second cluster 300) includes a second plurality of destination nodes, for example, a fifth node 302, a sixth node 304, a seventh node 306, and an eighth node 308, that are connected with a destination ingress router (e.g., a router 310).

In one example, if the bandwidth capacity of shared network 130 is 10 Gbps, a QoS policy may be implemented that sets a bandwidth limit for data transmission from first cluster 100 to second cluster 300 at 50% of the bandwidth capacity of shared network 130 (e.g., 5 Gbps). According to conventional methods of implementing QoS policies, the 5 Gbps bandwidth limit would be enforced by the source egress router to rate control the data streams between first cluster 100 and second cluster 300.

In contrast, according to the principles of the example embodiments, distributed QoS policy controls may implemented to control the rate of data streams on an individual node-to-node level. For example, as shown in FIG. 3, first cluster 100 includes four source nodes (e.g., first node 102, second node 104, third node 106, and fourth node 108) and second node 300 includes four destination nodes (e.g., fifth node 302, sixth node 304, seventh node 306, and eighth node 308). Accordingly, the distributed QoS policy controls according to the example embodiments provides for control over the rate of data streams 320 from each source node to each destination node, i.e., sixteen different combinations of individually controllable data streams 320. It should be further understood that in embodiments including additional source and/or destination nodes, the level of individual node-to-node level control for providing distributed QoS policies increases correspondingly (i.e., N source nodes×M destination nodes).

In one embodiment, consider a traffic shaping and rate control aspect of a QoS policy, for example, a token bucket (TB) approach. Under this approach, the distributed QoS policy of the example embodiments may be implemented to set a bandwidth limit for data transmission from all of the data streams 320 from source nodes of first cluster 100 to destination nodes of second cluster 300 (i.e., 16 individual node-node data streams) at 50% of the bandwidth capacity of shared network 130 (e.g., 5 Gbps).

In this embodiment, traffic shaping and rate control messages are distributed to each individual source node (e.g., first node 102, second node 104, third node 106, and fourth node 108) to allocate the available bandwidth limit according to the QoS policy over control channel 120. Additionally, in this embodiment, the source router (e.g., router 110) is relieved from enforcing QoS policy for first cluster 100. Each of the plurality of nodes 102, 104, 106, 108 implements a token bucket rate control, for example, a first token bucket rate control for first node 102 (TB1), a second token bucket rate control for second node 104 (TB2), a third token bucket rate control for third node 106 (TB3), and a fourth token bucket rate control for fourth node 108 (TB4). The sum of the rates, i.e., Rate (TB)=Sum (Rate(TB1)+Rate (TB2)+Rate(TB3)+Rate(TB4)), is less than or equal to 50% of bandwidth capacity of shared network 130 (e.g., 5 Gbps).

Control channel 120 between plurality of nodes 102, 104, 106, 108 may be used not only to send rate control messages, but may also be used to provide feedback to/from individual nodes of plurality of nodes 102, 104, 106, 108 of information associated with implementing the QoS policy. In other words, control channel 120 allows communication of messages between any nodes of plurality of nodes 102, 104, 106, 108 to obtain more detailed feedback on the behavior of each individual node during the process of implementing distributed QoS control for data transmission.

For example, second node 104 may have twice the amount of data to send because the data is imbalanced between plurality of nodes 102, 104, 106, 108. Accordingly, by providing this information as feedback over control channel 120, one possible QoS control decision would be to double the second token bucket rate control for second node 104 (TB2) and equivalently reduce the rate for the remaining nodes (e.g., Rate(TB1), Rate(TB3), and Rate(TB4)). With this arrangement, the feedback provided over control channel 120 permits the imbalance to be addressed on an individual node level through distributed QoS controls.

Additionally, in some embodiments, control channel 120 may be further established from the first plurality of nodes of the source cluster (e.g., nodes 102, 104, 106, 108 of first cluster 100) with the second plurality of nodes of the destination cluster (e.g., nodes 302, 304, 306, 308 of second cluster 300). As shown in FIG. 3, control channel 120 may extend over shared network 130 to plurality of nodes 302, 304, 306, 308 of second cluster 300. In this embodiment, control channel 120 is established as a separate communication path from data path/streams 320. With this arrangement, control channel 120 may also be used to provide feedback to/from individual nodes of second plurality of nodes 302, 304, 306, 308 of information associated with implementing the QoS policy by first plurality of nodes 102, 104, 106, 108. In other words, control channel 120 allows communication of messages between any nodes of first plurality of nodes 102, 104, 106, 108 to second plurality of nodes 302, 304, 306, 308 to obtain more detailed feedback on the behavior of each individual destination node during the process of implementing distributed QoS control for data transmission.

For example, seventh node 306 could be slow to receive data due to a failure of a component of seventh node 306. Accordingly, by providing this information as feedback over control channel 120, one possible QoS control decision would be to allocate the bandwidth assigned to transmit data to seventh node 306 to the remaining destination nodes (i.e., fifth node 302, sixth node 304, and eighth node 308) while seventh node 306 makes repairs. With this arrangement, the feedback provided over control channel 120 permits the slowdown to be addressed on an individual node level through distributed QoS controls.

Additionally, shared network 130 shown in FIG. 3 connecting the source cluster (e.g., first cluster 100) and the destination cluster (e.g., second cluster 300) may support multipath network connectivity. For example, data may be transmitted between first cluster 100 and second cluster 300 over shared network 130 using Equal-cost multi-path routing (ECMP) techniques or other methods of multipath routing.

The example embodiment described above illustrated one approach for an example distributed QoS control policy. It should be understood that other known approaches and/or algorithms may be used to enforce or control QoS policies for inter-cluster data transmissions in a distributed, individual node level according to the same principles of the example embodiments described herein.

Figure 4:
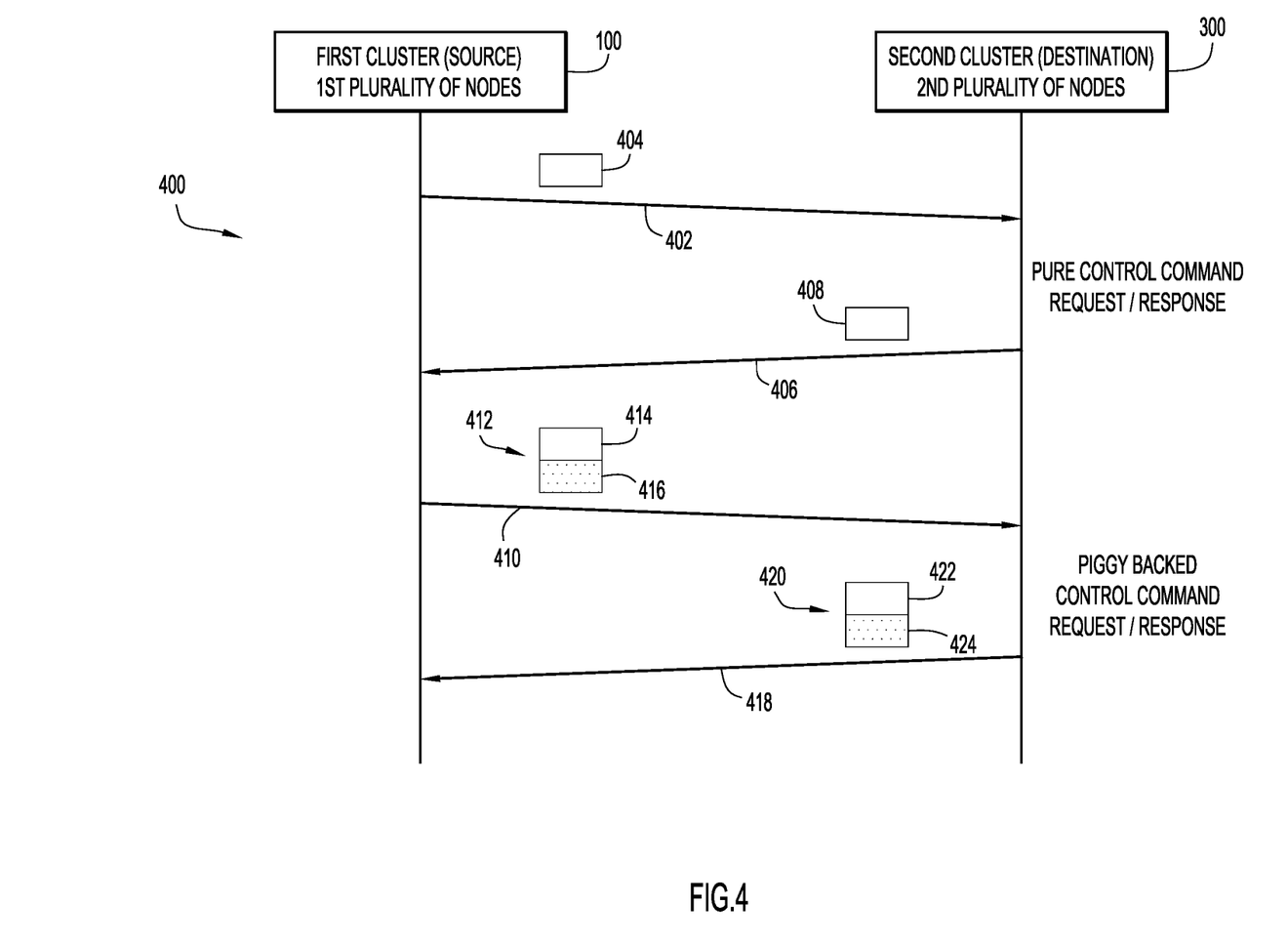
FIG. 4 is a ladder diagram of distributed quality of service control messages being transmitted between nodes of different clusters, according to an example embodiment.

Referring now to FIG. 4, a ladder diagram of distributed QoS control messages being transmitted between nodes of different clusters during an inter-cluster communication session 400 is illustrated according to an example embodiment. In this embodiment, QoS control messages are being communicated between first cluster 100 and second cluster 300. In the case of inter-cluster communication, for example, over control channel 120, an individual node or a leader node from a source cluster (e.g., second node 104 of first cluster 100) can query or receive information from a peer at the destination cluster (e.g., a leader node of second cluster 300).

In an example embodiment, the QoS control messages may be built over remote procedure call (rpc) as an extension to the Network File System (NFS) protocol with custom command sets. For example, FIG. 4 illustrates two types of command sets that may be used to send and/or receive information between nodes of first cluster 100 and second cluster 300 during inter-cluster communication session 400. In this embodiment, inter-cluster communication session 400 may include an operation 402 in which a node from first cluster 100 sends a control command request message 404. In response to a node of second cluster 300 receiving control command request message 404, at an operation 406, the node at second cluster 300 may send a control command response message 408. For example, control command request message 404 and control command response message 408 may be related to information for enforcing the QoS policy for data transmission between first cluster 100 and second cluster 300. The control command messages may be a pull request or a push from the destination cluster (e.g., second cluster 300). Examples of control command messages may include queries regarding the health or status of a particular node (e.g., a source and/or destination node) to determine QoS policy, a leader node at the source cluster (e.g., first cluster 100) may query the health of the source and/or destination cluster, and the destination cluster (e.g., second cluster 300) may indicate that it is busy reconfiguring itself or provide other information. These types of command sets, including, for example, control command request message 404 and control command response message 408, may be sent using control channel 120.

A second type of command sets may instead be sent as a hybrid-type of message that is included along with or "piggybacks" on the data being transmitted between first cluster 100 and second cluster 300 and the data acknowledgements sent in response, for example sent over data path/streams 320 (as shown in FIG. 3). In this embodiment, inter-cluster communication session 400 may further include an operation 410 in which a node from first cluster 100 sends a hybrid message 412 that includes a control command request 414 and a data payload 416. In response to a node of second cluster 300 receiving hybrid message 412, at an operation 418, the node at second cluster 300 may send a hybrid message 420 that includes a control command response 422 and a data acknowledgement payload 424. Examples of control command requests and control command responses may include any of the previously described control command messages above. In addition, statistics associated with performance of each data command may be used to determine the enforcement of the QoS policy at the node level. These types of command sets using hybrid messages may be sent over data path 320 of shared network 130 provided for data transmission between first cluster 100 and second cluster 300.

Figure 5:
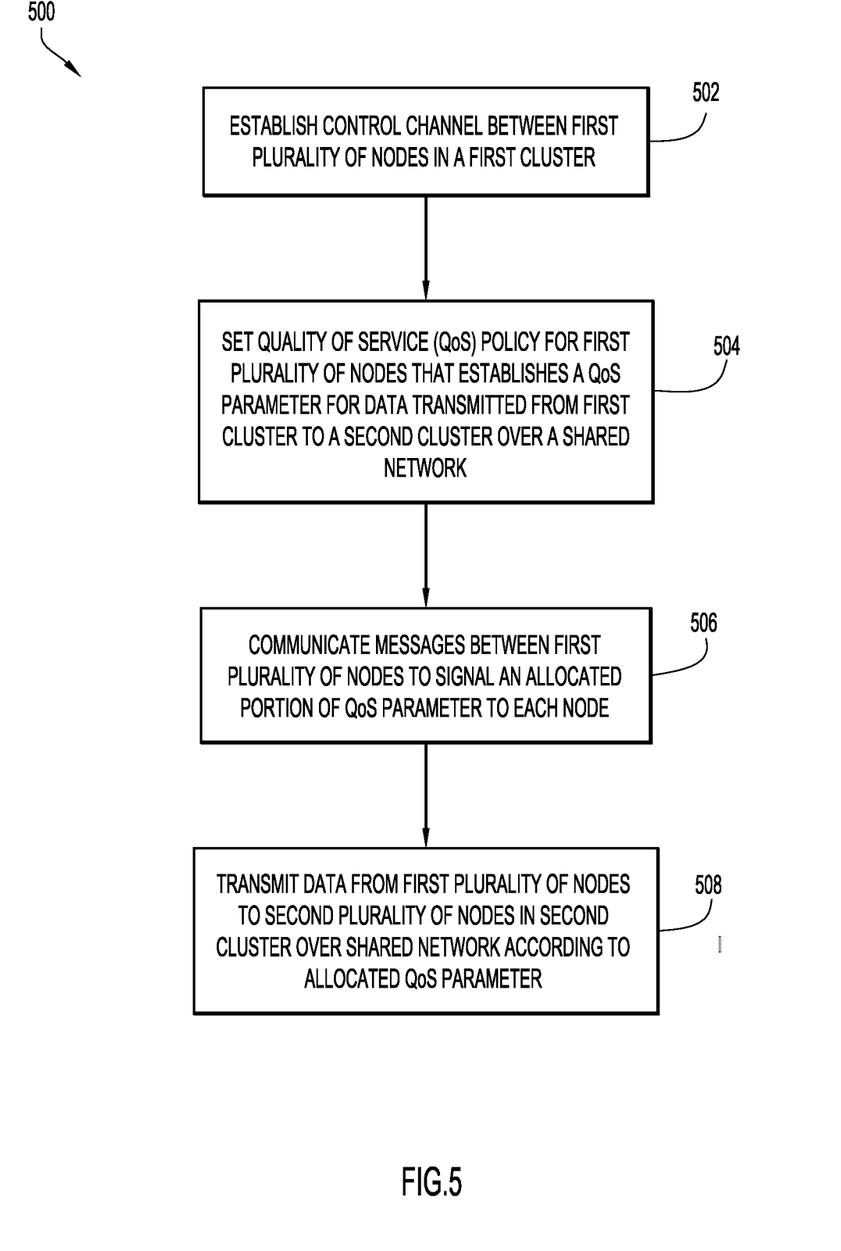
FIG. 5 is a flowchart of a method for implementing distributed quality of service controls for inter-cluster data transmissions, according to an example embodiment.

Referring now to FIG. 5, FIG. 5 illustrates a flowchart of a method 500 for implementing distributed QoS policy controls for inter-cluster data transmissions, according to an example embodiment. In an example embodiment, method 500 may be implemented by a leader node of a source cluster, for example, second node 104 of first cluster 100, described above in reference to FIGS. 1-4.

In this embodiment, method 500 may include an operation 502 where a control channel is established between a first plurality of nodes of a first cluster. For example, control channel 120 may be established between plurality of nodes 102, 104, 106, 108 of first cluster 100 by the leader node (e.g., second node 104). At an operation 504, a QoS policy may be set for the first plurality of nodes to establish a bandwidth limit for data transmitted from the first cluster to a second cluster over a shared network. For example, as shown in FIG. 1, QoS policy may be input 140 by an administrator to the leader node (e.g., second node 104) to establish a bandwidth limit for data transmitted over shared network 130 from first cluster 100 to second cluster 300.

Next, at an operation 506, messages are communicated between the first plurality of nodes to signal an allocated bandwidth within the bandwidth limit established by the QoS policy set at operation 504. For example, as shown in FIG. 2, the leader node (e.g., second node 104) may send a plurality of messages 200, 202, 210, 212, 220, 222 over control channel 120 to the other nodes in first cluster 100 to allocate specific portions of bandwidth within the bandwidth limit of the QoS policy.

At an operation 508, method 500 includes transmitting data from the first plurality of nodes of the first cluster to a second plurality of nodes of the second cluster over the shared network according to the allocated bandwidth. For example, as shown in FIG. 3, first plurality of nodes 102, 104, 106, 108 of first cluster 100 may transmit data over shared network 130 to second plurality of nodes 302, 304, 306, 308 of second cluster 300 according to the allocated bandwidth that was established by the QoS policy and communicated via plurality of messages 200, 202, 210, 212, 220, 222 over control channel 120 to the nodes in first cluster 100.

In this embodiment, method 500 may end upon the completion of the transmission of data between the first and second cluster. Method 500 may repeat from operation 502 upon the next occurrence of an inter-cluster data transmission session. In other embodiments, additional operations may occur during method 500, for example, based on feedback from one or more source and/or cluster nodes that result in modifications or changes to the allocation of bandwidth between individual nodes of the clusters, as described above.

Figure 6:
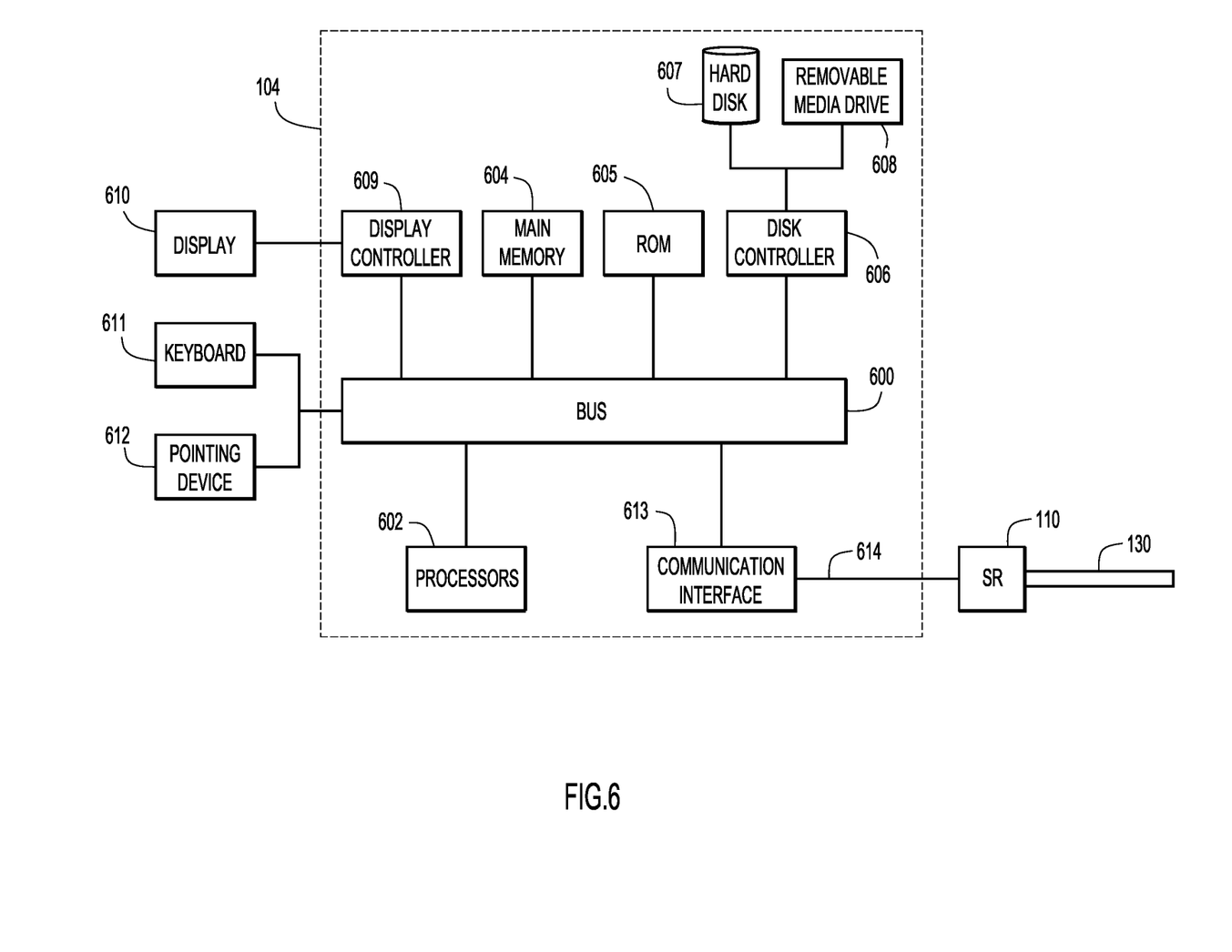
FIG. 6 is a block diagram of a computer system for implementing distributed quality of service controls for inter-cluster data transmissions, according to an example embodiment.

FIG. 6 illustrates a computer system upon which the embodiments presented may be implemented. The computer system may be programmed to implement a computer based device or apparatus, such as a service node or destination node at one or more clusters, including first cluster 100 and/or second cluster 300, described above. In one embodiment, the computer system or apparatus may be programmed to implement second node 104 (e.g., the leader node for plurality of nodes 102, 104, 106, 108 of first cluster 100). In this embodiment, second node 104 includes a bus 600 or other communication mechanism for communicating information, and a processor 602 coupled with the bus 600 for processing the information. While the figure shows a single block 602 for a processor, it should be understood that the processors 602 may represent a plurality of processing cores, each of which can perform separate processing. Second node 104 also includes a main memory 604, such as a random access memory (RAM) or other dynamic storage device (e.g., dynamic RAM (DRAM), static RAM (SRAM), and synchronous DRAM (SD RAM)), coupled to the bus 600 for storing information and instructions to be executed by processor 602. In addition, the main memory 604 may be used for storing temporary variables or other intermediate information during the execution of instructions by the processor 602.

Second node 104 further includes a read only memory (ROM) 605 or other static storage device (e.g., programmable ROM (PROM), erasable PROM (EPROM), and electrically erasable PROM (EEPROM)) coupled to the bus 600 for storing static information and instructions for the processor 602.

Second node 104 also includes a disk controller 606 coupled to the bus 600 to control one or more storage devices for storing information and instructions, such as a magnetic hard disk 607 or solid state drive, and a removable media drive 608 (e.g., floppy disk drive, read-only compact disc drive, read/write compact disc drive, removable magneto-optical drive and optical storage drive). The storage devices may be added to second node 104 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

Second node 104 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Second node 104 may also include a display controller 609 coupled to the bus 600 to control a display 610, such as a Liquid Crystal Display (LCD), Light Emitting Diode (LED) display, or other now known or hereinafter developed display technologies, for displaying information to a computer user, for example, an administrator who may provide input 140 to second node 104, as described with reference to FIG. 1 above. Second node 104 may also include input devices, such as a keyboard 611 and a pointing device 612, for interacting with a computer user and providing information to the processor 602. The pointing device 612, for example, may be a mouse, a trackball, a pointing stick or a touch-pad, for communicating direction information and command selections to the processor 602 and for controlling cursor movement on the display 610. The display 610 may be a touch-screen display.

Second node 104 performs a portion or all of the processing steps of the process in response to the processor 602 executing one or more sequences of one or more instructions contained in a memory, such as the main memory 604. Such instructions may be read into the main memory 604 from another computer readable medium, such as a hard disk or solid state drive 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, second node 104 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling second node 104, for driving a device or devices for implementing the process, and for enabling second node 104 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Second node 104 also includes a communication interface 613 coupled to the bus 600. The communication interface 613 provides a two-way data communication coupling to a network link 614 that is connected to, for example, router 110, or to another communications network, such as shared network 130. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to one or more nodes of the plurality of nodes 102, 104, 106, 108 of first cluster 100 and/or plurality of nodes 302, 304, 306, 308 of second cluster 300. In one embodiment, control channel 120, described above, may be implemented through network link 614. Network link 614 may be connected to other nodes through a local area network (e.g., a LAN) or through equipment operated by a service provider, which provides communication services through a communications network. Network link 614, shared network 130, and/or other communications networks may use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from second node 104 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. Second node 104 can transmit and receive data, including program code, through shared network 130, control channel 120, the network link 614, and/or the communication interface 613.

The principles of the example embodiments described herein can provide a technique that does not require individual nodes to notice packet failures and govern themselves. The example embodiments described herein can avoid Transmission Control Protocol (TCP) "thundering herd" problems. Each individual node can independently provide QoS to itself while being a good participant in the overall cluster. Additionally, the principles of the example embodiments described herein simplify the work of edge routers and improves overall utilization of the allocated bandwidth for a service.

The example embodiments provide a distributed approach to enforce QoS at the node level rather than at the aggregator (i.e., edge routers). The principles of the example embodiments described herein provide QoS policies that are well-tailored to a distributed application while providing service level agreement (SLA) at the aggregate level. This allows faster, efficient, and precise real-time decisions about how to control QoS parameters as these decisions are made locally at the node-level and have an additional and separate control channel path to obtain feedback from all node participants in the application service.

In summary, a method is provided comprising: establishing a control channel between a first plurality of nodes associated with a first cluster; setting a quality of service (QoS) policy for the first plurality of nodes that establishes a bandwidth limit for data transmitted from the first cluster to a second cluster over a shared network, wherein the second cluster comprises a second plurality of nodes; communicating messages between the first plurality of nodes over the control channel to signal an allocated bandwidth within the bandwidth limit of the QoS policy between each node of the first plurality of nodes; and transmitting data by the first plurality of nodes of the first cluster to the second plurality of nodes of the second cluster over the shared network according to the allocated bandwidth communicated over the control channel.

In another form, a non-transitory computer readable storage media encoded with instructions that, when executed by a processor, cause the processor to perform operations is provided comprising: establishing a control channel between a first plurality of nodes associated with a first cluster; setting a quality of service (QoS) policy for the first plurality of nodes that establishes a bandwidth limit for data transmitted from the first cluster to a second cluster over a shared network, wherein the second cluster comprises a second plurality of nodes; communicating messages between the first plurality of nodes over the control channel to signal an allocated bandwidth within the bandwidth limit of the QoS policy between each node of the first plurality of nodes; and transmitting data by the first plurality of nodes of the first cluster to the second plurality of nodes of the second cluster over the shared network according to the allocated bandwidth communicated over the control channel.

Furthermore, an apparatus is provided comprising: a network interface configured to enable network communications with a first plurality of nodes in a first cluster; a memory; and a processor coupled with the memory and the network interface, and configured to: establish a control channel between the first plurality of nodes; set a quality of service (QoS) policy for the first plurality of nodes that establishes a bandwidth limit for data transmitted from the first cluster to a second cluster over a shared network, wherein the second cluster comprises a second plurality of nodes; communicate messages to one or more nodes of the first plurality of nodes over the control channel to signal an allocated bandwidth within the bandwidth limit of the QoS policy between each node of the first plurality of nodes; and transmit data to the second plurality of nodes of the second cluster over the shared network according to the allocated bandwidth communicated over the control channel.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   electing a leader node among a first plurality of nodes associated with a first cluster;
   by the leader node, establishing a control channel between the first plurality of nodes associated with the first cluster;
   by the leader node, setting a quality of service (QoS) policy for the first plurality of nodes that establishes at least one QoS parameter for data transmitted from the first cluster to a second cluster over a shared network, wherein the second cluster comprises a second plurality of nodes;
   by the leader node, communicating messages to one or more other nodes of the first plurality of nodes over the control channel to signal respective allocated portions of the at least one QoS parameter for the QoS policy to be enforced by the one or more other nodes of the first plurality of nodes when transmitting data;
   transmitting data by the first plurality of nodes of the first cluster to the second plurality of nodes of the second cluster over the shared network according to the respective allocated portions of the at least one QoS parameter communicated over the control channel; and
   by the leader node, sending hybrid control command request messages to the second plurality of nodes, wherein the hybrid control command request messages each includes (i) a control command request configured to enforce a bandwidth limit and an allocated bandwidth of the QoS policy established between the first plurality of nodes and the second plurality of nodes, and (ii) a portion of the data transmitted by the first plurality of nodes to the second plurality of nodes and that is subject to the QoS policy.

2. The method of claim 1, wherein the bandwidth limit is for data transmitted from the first cluster to the second cluster over the shared network; and
   wherein the allocated bandwidth is within the bandwidth limit.

3. The method of claim 1, wherein the QoS policy is a static policy determined prior to transmitting data from the first cluster to the second cluster.

4. The method of claim 1, wherein the QoS policy is a dynamic policy based on messages received over the control channel from one or more nodes of the first plurality of nodes.

5. The method of claim 1, further comprising:
   receiving messages from one or more nodes of the second plurality of nodes of the second cluster.

6. The method of claim 4, wherein the messages from the one or more nodes of the second plurality of nodes of the second cluster are received over the control channel.

7. The method of claim 4, wherein the messages from the one or more nodes of the second plurality of nodes of the second cluster are included with the data transmitted between the first cluster and the second cluster over the shared network, such that the messages from the one or more nodes of the second plurality of nodes include hybrid messages that each include a control command and a data payload for the data.

8. The method of claim 4, wherein the QoS policy is a dynamic policy based on messages received over the control channel from one or more nodes of the second plurality of nodes.

9. A non-transitory computer readable storage media encoded with instructions that, when executed by a processor, cause the processor to perform operations comprising:
   electing a leader node among a first plurality of nodes associated with a first cluster;
   by the leader node, establishing a control channel between the first plurality of nodes associated with the first cluster;
   by the leader node, setting a quality of service (QoS) policy for the first plurality of nodes that establishes at least one QoS parameter for data transmitted from the first cluster to a second cluster over a shared network, wherein the second cluster comprises a second plurality of nodes;
   by the leader node, communicating messages to one or more other nodes of the first plurality of nodes over the control channel to signal respective allocated portions of the at least one QoS parameter for the QoS policy to be enforced by the one or more other nodes of the first plurality of nodes when transmitting data;
   transmitting data by the first plurality of nodes of the first cluster to the second plurality of nodes of the second cluster over the shared network according to the respective allocated portions of the at least one QoS parameter communicated over the control channel; and
   by the leader node, sending hybrid control command request messages to the second plurality of nodes, wherein the hybrid control command request messages each includes (i) a control command request configured to enforce a bandwidth limit and an allocated bandwidth of the QoS policy established between the first plurality of nodes and the second plurality of nodes, and (ii) a portion of the data transmitted by the first plurality of nodes to the second plurality of nodes and that is subject to the QoS policy.

10. The non-transitory computer readable storage media of claim 9, wherein the bandwidth limit is for data transmitted from the first cluster to the second cluster over the shared network; and
    wherein the allocated bandwidth is within the bandwidth limit.

11. The non-transitory computer readable storage media of claim 9, wherein the QoS policy is a static policy determined prior to transmitting data from the first cluster to the second cluster.

12. The non-transitory computer readable storage media of claim 9, wherein the QoS policy is a dynamic policy based on messages received over the control channel from one or more nodes of the first plurality of nodes and/or one or more nodes of the second plurality of nodes.

13. The non-transitory computer readable storage media of claim 9, further comprising:
    receiving messages from one or more nodes of the second plurality of nodes of the second cluster.

14. The non-transitory computer readable storage media of claim 13, wherein the messages from the one or more nodes of the second plurality of nodes of the second cluster are included with the data transmitted between the first cluster and the second cluster over the shared network.

15. An apparatus comprising:
    a network interface configured to enable network communications with a first plurality of nodes in a first cluster;

a memory; and a processor coupled with the memory and the network interface, and configured to:

elect a leader node among the first plurality of nodes in the first cluster;

by the leader node, establish a control channel between the first plurality of nodes;

by the leader node, set a quality of service (QoS) policy for the first plurality of nodes that establishes at least one QoS parameter for data transmitted from the first cluster to a second cluster over a shared network, wherein the second cluster comprises a second plurality of nodes;

by the leader node, communicate messages to one or more other nodes of the first plurality of nodes over the control channel to signal respective allocated portions of the at least one QoS parameter for the QoS policy to be enforced by the one or more other nodes of the first plurality of nodes when transmitting data transmit data to the second plurality of nodes of the second cluster over the shared network according to the respective allocated portions of the at least one QoS parameter communicated over the control channel; and by the leader node, send hybrid control command request messages to the second plurality of nodes, wherein the hybrid control command request messages each includes (i) a control command request configured to enforce a bandwidth limit and an allocated bandwidth of the QoS policy established between the first plurality of nodes and the second plurality of nodes, and (ii) a portion of the data transmitted by the first plurality of nodes to the second plurality of nodes and that is subject to the QoS policy.

16. The apparatus of claim 15, wherein the bandwidth limit is for data transmitted from the first cluster to the second cluster over the shared network; and wherein the allocated bandwidth is within the bandwidth limit.

17. The apparatus of claim 15, wherein the QoS policy is a static policy determined prior to transmitting data from the first cluster to the second cluster.

18. The apparatus of claim 15, wherein the QoS policy is a dynamic policy based on messages received over the control channel from one or more nodes of the first plurality of nodes and/or one or more nodes of the second plurality of nodes.

19. The apparatus of claim 15, wherein the processor is further configured to:

receive messages from one or more nodes of the second plurality of nodes of the second cluster.

20. The apparatus of claim 19, wherein the messages from the one or more nodes of the second plurality of nodes of the second cluster are: received over the control channel, included with the data transmitted between the first cluster and the second cluster over the shared network, or both.

21. The method of claim 1, further comprising:

by the leader node, receiving hybrid control command response messages from the second plurality of nodes, the hybrid control command response messages each including (iii) a control command response responsive to a corresponding one of the hybrid control command request messages and configured to enforce the QoS policy, and (iv) a portion of data transmitted from the second plurality of nodes to the first plurality of nodes.

22. The method of claim 21, wherein:

the control command request includes a query for a health or a status of a node; and the control command response includes an indication of whether the node is busy or reconfiguring itself.

23. The method of claim 1, wherein, in each of the hybrid control command request messages, the control command request piggybacks on the portion of the data.

* * * * *